United States Patent

Pankofer et al.

(10) Patent No.: US 9,762,161 B2
(45) Date of Patent: Sep. 12, 2017

(54) ON-LOAD TAP CHANGER

(71) Applicants: Martin Pankofer, Plattling (DE); Andreas Stocker, Neutraubling (DE)

(72) Inventors: Martin Pankofer, Plattling (DE); Andreas Stocker, Neutraubling (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 227 days.

(21) Appl. No.: 14/382,327

(22) PCT Filed: Mar. 25, 2013

(86) PCT No.: PCT/EP2013/056264
§ 371 (c)(1),
(2) Date: Sep. 1, 2014

(87) PCT Pub. No.: WO2013/156265
PCT Pub. Date: Oct. 24, 2013

(65) Prior Publication Data
US 2015/0091684 A1    Apr. 2, 2015

(30) Foreign Application Priority Data
Apr. 20, 2012  (DE) .................... 20 2012 101 477 U (51) Int. Cl.
*H01H 9/00* (2006.01)
*H01H 33/666* (2006.01)
(Continued)

(52) U.S. Cl.
CPC ............. *H02P 13/06* (2013.01); *H01F 29/04* (2013.01); *H01H 9/0038* (2013.01);
(Continued)

(58) Field of Classification Search
CPC ............... H01H 9/0038; H01H 9/0044; H01H 2009/005; H01H 2009/0055;
(Continued)

(56) References Cited

U.S. PATENT DOCUMENTS 3,138,671 A * 6/1964 Lepper ................ H01H 9/0005
                                                200/11 TC
4,234,864 A    11/1980 Johansson
(Continued)

FOREIGN PATENT DOCUMENTS

| DE | 19847745 B | | 1/2000 | |
| DE | WO2011012181 | * | 2/2011 | ............. H01F 27/40 |
| JP | S59204224 B | | 11/1984 | |

OTHER PUBLICATIONS

Machine translation DE19847745 (orig. doc published Jan. 5, 2000).*

(Continued)

*Primary Examiner* — Renee Luebke
*Assistant Examiner* — William Bolton
(74) *Attorney, Agent, or Firm* — Andrew Wilford (57) ABSTRACT

An on-load tap changer for uninterrupted switching between different winding taps of a tapped transformer has a plurality of fixed selector contacts electrically connected with the individual winding taps, arranged in a line, and actuatable by two longitudinally displaceable movable selector contacts. Two vacuum interrupters serve for the uninterrupted switching of each phase. A motor drive actuates the on-load tap changer. The entire load changeover switch is arranged by a transmission module on the underside of a transformer cover.

17 Claims, 11 Drawing Sheets

(51) Int. Cl.
*H01F 29/04* (2006.01)
*H02P 13/06* (2006.01)

(52) U.S. Cl.
CPC ........ *H01H 9/0044* (2013.01); *H01H 33/666* (2013.01); *H01H 9/0027* (2013.01)

(58) Field of Classification Search
CPC ...... H01H 33/666; H01H 9/0011; H01H 9/00; H01F 29/04; H02P 13/06
USPC .............................. 218/112, 140; 200/11 TC
See application file for complete search history.

(56) References Cited

U.S. PATENT DOCUMENTS

| | | | |
|---|---|---|---|
| 5,523,674 A * | 6/1996 | Dohnal | H01H 9/0038 323/340 |
| 7,145,760 B2 | 12/2006 | Stenestam | |
| 8,648,587 B2 | 2/2014 | Brueckl | |
| 2012/0139510 A1 | 6/2012 | Wrede | |
| 2013/0213777 A1 | 8/2013 | Dohna | |

OTHER PUBLICATIONS

Machine translation WO2011012181 (orig. doc. published Feb. 2011).*

* cited by examiner

ON-LOAD TAP CHANGER

CROSS REFERENCE TO RELATED APPLICATIONS

This application is the US-national stage of PCT application PCT/EP2013/056264 filed 25 Mar. 2013 and claiming the priority of German patent application 202012101477.7 itself filed 20 Apr. 2012.

FIELD OF THE INVENTION

The present invention relates to an on-load tap changer for uninterrupted switching between different winding taps of a tapped transformer having at least one selector contact unit with a plurality of fixed selector contacts electrically connected with the individual winding taps and arranged along a line and in which:

the fixed selector contacts are actuatable by two longitudinally displaceable movable selector contacts, two vacuum interrupters are provided for the uninterrupted switching of each phase, and a motor drive actuates the on-load tap changer.

BACKGROUND OF THE INVENTION

On-load tap changers have been in use worldwide on a large scale for many years for uninterrupted switching between different winding taps of tapped transformers. So-called reactor switches, which are particularly widespread in North America, have a switch-over reactance that enables a slow, continuous switching. On-load tap changers according to the resistance fast switching principle usually consist of a selector for power-free selection of the respective winding tap of the tapped transformer that is to be switched to and a load changeover switch for the actual changing over from the previous to the new, preselected winding tap. The load changeover switch for that purpose usually comprises switch contacts and resistance contacts. The switch contacts in that case serve for direct connection of the respective winding tap with the load diverter and the resistance contacts for temporary connection, i.e. bridging-over by means of one or more switching-over resistances. However, developments in recent years have led away from load changeover switches with mechanical switching contacts in insulating oil. Instead, vacuum interrupters are increasingly employed as switching elements.

An on-load tap changer of that kind with vacuum interrupters is disclosed in, for example, DE 10 2009 043 171 [US 2012/0139510]. Here, a load changeover switch carries a drive shaft, which is drivable by an energy store, with at least one cam disk. The cam disk has a plurality of cams, wherein two cams arranged at the cam disk at the end have a profile that departs from the circular shape, in the form of lobes at which a respective roller that is connected with a vacuum interrupter by way of a rocker arm and that scans the profiled contour of the respective cam, is guided with maintained contact.

In one specific category of on-load tap changer, i.e. so-called load selectors, the described means for selection of a new winding tap and the means for the actual load changeover are constructionally combined and actuated in common. Tap changers according to the principle of resistance fast switching for uninterrupted switching from one winding tap at the tapped transformer to another are usually constructed so that the respective fixed tap contacts electrically connected with the output lines of the tap windings are arranged in one or more horizontal planes circularly at an insulating-material frame or cylinder and are connectable by rotatable contact bridges actuated by concentric drive shafts. In the case of load selectors in which the tap selection and the actual load switching are combined, actuation of the contact bridges in that case takes place abruptly after triggering of an energy store, usually a spring-force store, drawn up by the drive shaft of the switch.

In departure from these usual constructions, a tap changer with linear contact actuation is described in DE 42 37 165 [U.S. Pat. No. 5,523,671], wherein the fixed tap contacts extend along a track in the interior of the switch and are connectable by a displaceable switching mechanism that in turn is driven by the drive shaft. The vertically displaceable switching mechanism in that case consists of a draw-up carriage that is continuously drivable by the drive shaft and that preselects the new fixed tap contact, and a drive output part that can be drawn up by the draw-up carriage by means of an energy store and that after triggering abruptly runs after the draw-up carriage and in that case executes the actual load changeover from the previous tap of the tapped winding to the preselected new tap. The switch elements required for that purpose are a component of the output drive part.

A further on-load tap changer, which is attributable to the applicant, with linearly arranged selector contacts has become known from DE 198 47 745. Disposed above the selector contacts, thus locally separated, are the stationary vacuum interrupters, which are associated with the respective selector contacts of each phase, for the actual, abrupt load changeover. A spring energy store is necessary for actuation of this on-load tap changer that store actuates the selector contacts during its drawing up movement as well as the vacuum switching elements by its abrupt drive output movement.

Such on-load tap changers are in principle known as built-in changers or attachment changers. A typical built-in changer usually consists of a load changeover switch in a separate oil vessel for the uninterrupted load changeover and, arranged thereunder, a selector for preselection of the winding tap of the tapped transformer that is to be switched to. Such built-in changer, hence the name, is introduced from above completely into the oil-filled transformer vessel and mounted. In that case it is ensured by the separate oil vessel of the load changeover switch that the oil volume thereof does not mix with the surrounding insulating oil in the transformer vessel. It is then generally necessary to lead electrical lines as a so-called line structure from the individual winding taps in the interior of the transformer through the transformer vessel to the tap changer.

A typical attachment changer, such as is known from, for example, the company publication of Reinhausen Manufacturing Inc., 'VACUTAP (Registered Trade Mark) RMV-A On-Load Tap Changer for Regulating Transformers', has a separate, surrounding housing, usually of sheet metal, and is placed laterally on the outer wall of the transformer. The housing of such an attachment changer is filled with insulating oil. It is also necessary in this case to lead the electrical lines from the individual winding taps in the interior of the transformer through the entire transformer vessel and moreover additionally through a so-called transformer board, which seals and is also termed barrier board, outwardly to the laterally attached tap changer. DE 29 23 170 [U.S. Pat. No. 4,234,864] describes such a transformer board, there termed 'terminal board'. It is necessary—because the attached tap changer is accommodated in a separate oil-filled housing—for there to be separation from the similarly oil-filled transformer vessel by an oil-tight partition wall, wherein the connections for connecting the transformer taps with the tap changer are provided at the 'terminal board'. Not only the necessary line structure, but also the transformer board are complicated and costly.

In addition, it is necessary in all the prior art to provide a separate oil circuit for the tap changer that usually also includes a separate protective relay, individual pipelines as well as a separate expander and also separate dehumidifier.

OBJECT OF THE INVENTION

The object of the present invention is to avoid the disadvantages of these known solutions and to indicate an economic tap changer of simple construction.

SUMMARY OF THE INVENTION

This object is fulfilled by an on-load tap changer for uninterrupted switching between different winding taps of a tapped transformer in which the entire load changeover switch is arranged by a transmission module on the underside of a transformer cover.

The idea according to the invention consists of fastening the on-load tap changer directly to the underside of the transformer cover by means of a transmission module that cooperates with the motor drive arranged at the opposite outer side of the transformer cover. The transmission module has, for that purpose, a flange-like sealing module that is arranged directly at the underside of the transformer cover and that is detachably connected, in particular screw-connected, with the motor drive. According to the invention, the entire load changeover switch is thus fastened to the transmission module. The transmission module thus has not only the task of mounting the on-load tap changer, but also the task of sealing relative to the outer side of the transformer by means of the sealing module. Twistings of the transformer cover during transport of the transformer are thus not transmitted to the on-load tap changer. In addition, a connecting flange with milled-over sealing surface at the transformer cover can thus be eliminated. Beyond that, this form of proposed fastening offers to the transformer manufacturer simple mounting of the on-load tap changer within the transformer vessel.

According to a further preferred form of embodiment of the invention a support plate of a dielectric material, particularly a plastics material, is provided, at which the selector contact unit is arranged on a first side and the switching means for uninterrupted switching-over on a second side in such a manner that the support plate produces the spacing from ground necessary for the on-load tap changer.

According to yet a further form of embodiment of the invention the at least one selector contact unit during switching-over is moved along two substantially parallel arranged guide rods that ensure linear guidance of the at least one selector contact unit and that are mounted by a plurality of cross members arranged at the support plate. A selector contact unit in that case comprises a respective slide carriage as well as a contact carrier for receiving the movable selector contacts that cooperate with the fixed selector contacts.

According to yet a further form of embodiment of the invention the movable selector contacts are respectively received in a contact carrier and cooperate with fixed selector contacts that are arranged at the support plate, in such a manner that the individual fixed selector contacts are connectable by a longitudinal displacement of the movable selector contacts inclusive of the slide carriages, thus the selector contact unit, along the guide rod. By virtue of the movement of the selector contact unit to and/or fro the individual fixed selector contacts are connected and thus run through the regulating range of the on-load tap changer. The plurality of cross members, on which the guide rods are mounted, in particularly simple manner forms a mechanical abutment for the movable selector contacts displaceable longitudinally, so that the regulating range is thereby also mechanically limited.

According to yet a further preferred form of embodiment the switching means for the uninterrupted switching are directly arranged on the respective slide carriage of the corresponding selector contact unit. In this form of embodiment as well the switching means for the uninterrupted switching, as also the selector contact unit, are operated by a common motor drive without interposition of an energy store, in that the motor drive drives, by means of a diverter transmission, a central threaded spindle that in turn again converts the rotational movement into a longitudinal displacement of the slide carriages in such a manner that as a result not only the movable selector contacts, but also the switching means—that are arranged at the selector contact unit—for the uninterrupted switching are actuatable.

According yet a further preferred form of embodiment of the invention not only a threaded spindle that for its part is operatively connected with the selector contact unit, but also a camshaft, by means of which the switching means for the uninterrupted switching are actuatable, are driven by the motor drive. This makes possible in particularly advantageous manner a simple independent actuation of the selector contact unit by the switching means for the uninterrupted switching.

BRIEF DESCRIPTION OF THE DRAWING

The invention and the advantages thereof are described in more detail in the following with reference to the accompanying drawings, in which:

FIG. 6b is a detail view of the side perspective view according to FIG. 6a;

FIG. 7b is a second side perspective view of the further form of embodiment according to FIG. 7a.

SPECIFIC DESCRIPTION OF THE INVENTION

Figure 1:
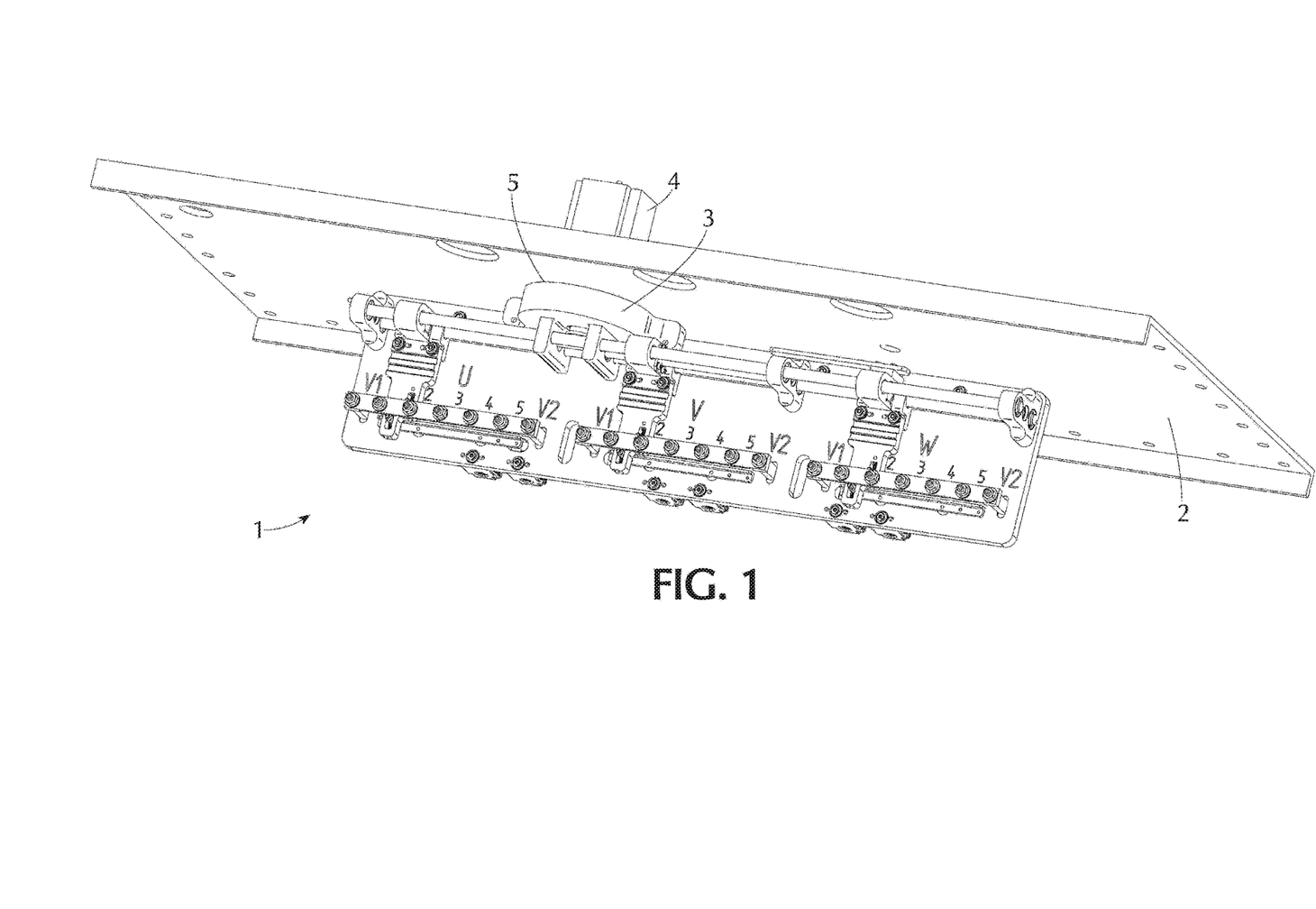
FIG. 1 is a schematic perspective view of one form of embodiment of the on-load tap changer according to the invention.

An on-load tap changer 1 according to the invention that is arranged directly below a transformer cover 2 of a tapped transformer (not illustrated in more detail), is shown in FIG. 1 in a perspective view. A more precise description of the components of the on-load tap changer 1 and the function thereof can be inferred from the description of the figures further below. A tapped transformer of that kind, which is well-known from the prior art, comprises a transformer vessel that is filled with insulating oil and in which at least one winding is arranged at an iron yoke. This winding is divided into a main winding and a regulating winding, at which a plurality of winding taps forming the regulating range is provided. In addition, the on-load tap changer comprises a transmission module 3 that is attached to the underside of the transformer cover 2 and that cooperates with a motor drive 4 arranged at the opposite, outer side of the transformer cover 2. The motor drive 4 can in that case be constructed as, for example, a proprietary step motor. The transmission module 3 comprises a flange-like sealing module 5 that is arranged directly at the underside of the transformer cover 2 and detachably connected, in particular screw-connected, with the motor drive 4. The entire on-load tap changer 1 is thus fastened to the transmission module 3. The transmission module 3 fulfils not only the task of mounting the on-load tap changer 1, but also the task of hermetically sealing relative to the outer side of the transformer by means of the sealing module 5. Consequently, twistings of the transformer cover 2 during transport of the transformer are not transmitted to the on-load tap changer 1.

Figure 2A:
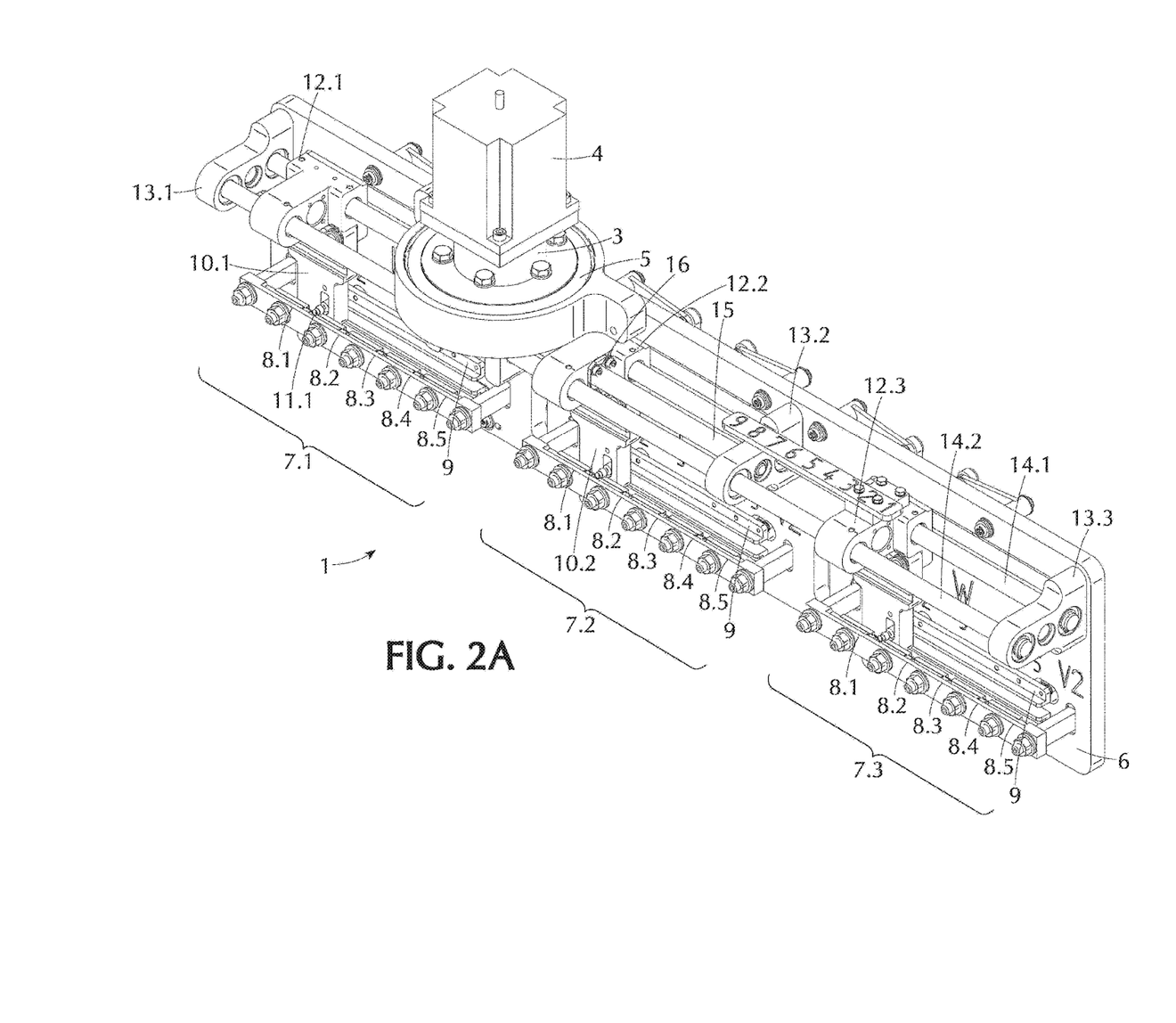
FIG. 2a is a first side perspective view of the on-load tap changer according to FIG. 1, at which the selector contacts are arranged.
Figure 2B:
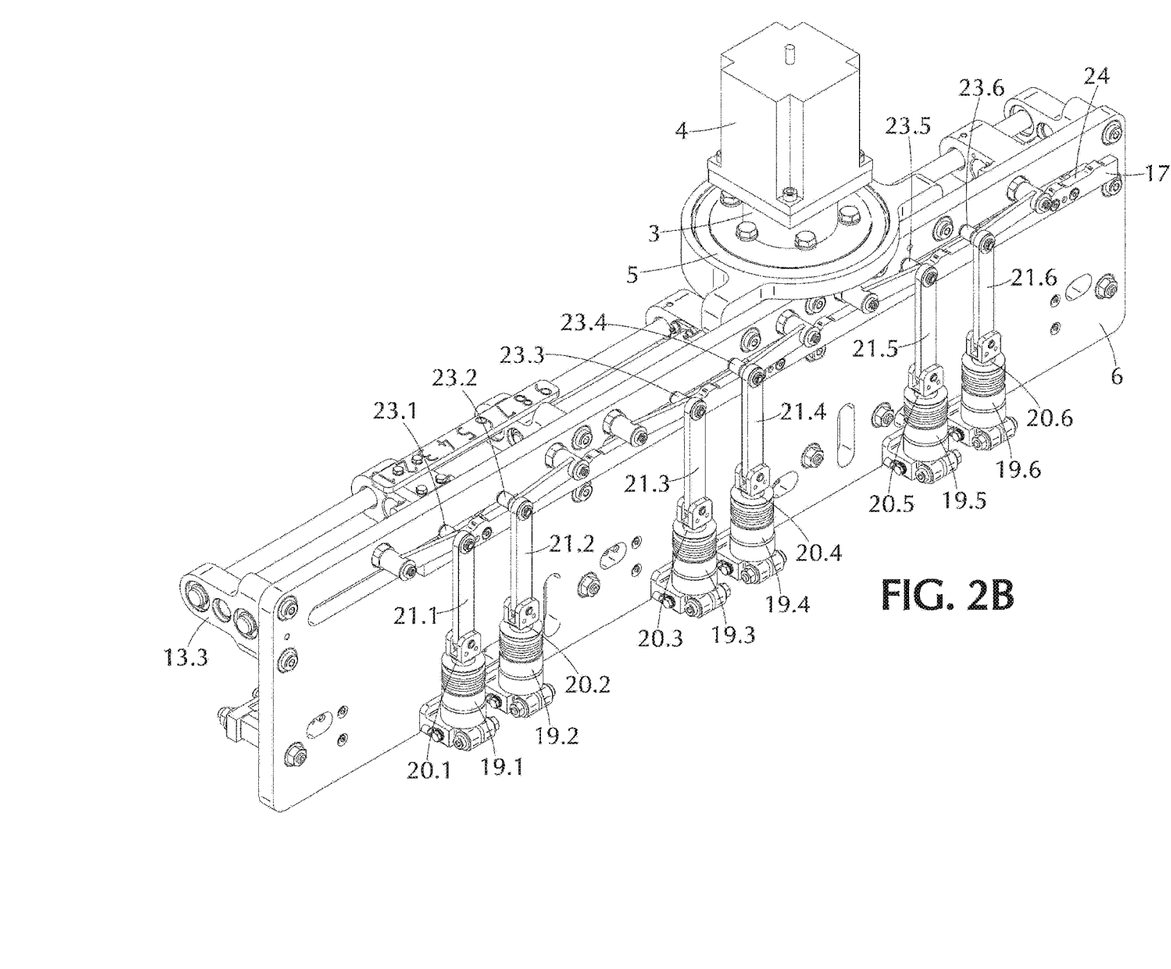
FIG. 2b is a second side perspective view of the on-load tap changer according to FIG. 1, at which the switching means for the uninterrupted load changeover are arranged.

FIGS. 2a and 2b show the on-load tap changer 1 according to the invention in two different perspective side views. Mechanically connected with the transmission module 3 is a support plate 6 of dielectric material, to which the individual subassemblies of the on-load tap changer 1 are fastenable. The support plate 6 is in that case made from electrically insulating material and constructed for the purpose of holding all significant components of the on-load tap changer 1. In that case, FIG. 2a shows the first side of the on-load tap changer 1, at which the subassemblies of the at least selector contact unit 7.1, 7.2 and 7.3 are fastened to the support plate 6. In the illustration of FIG. 2a there are, for example, three selector contact units 7.1, 7.2 and 7.3; each selector contact unit 7.1, 7.2 and 7.3 is in that case connected with a separate phase, thus winding, of the tapped transformer. Each selector contact unit 7.1 . . . 7.3 comprises a respective plurality of connectable fixed selector contacts 8.1 . . . 8.5 that are electrically connected with the winding taps of the regulating winding of the tapped transformer, a contact rail 9 connected with a load diverter LA, and a contact carrier 10.1 . . . 10.3 with two respective resiliently mounted, movable selector contacts 11.1, 11.2. Regardless of the principle of switching, thus according to the reactor switching principle or resistance fast switching principle, in that case middle settings—in which one movable selector contact, for example the movable selector contact 11.1, is connected with the first fixed selector contact, for example the fixed selector contact 8.1, and the other movable selector contact, for example the movable selector contact 11.2, is connected with the second fixed selector contact, for example the fixed selector contact 8.2, adjacent to the first fixed selector contact—are permissible as stationary operational settings of the on-load tap changer 1. Thus, according to the reactor switching principle nine stationary operational settings are possible with the, here, five illustrated fixed selector contacts 8.1 . . . 8.5, whereas in the case of an on-load tap changer 1 according to the resistance fast switching principle, in which no middle settings are permissible, there are only five stationary operational settings. The contact carrier 10.1 . . . 10.3 of each phase is then mechanically fixed to a slide carriage 12.1 . . . 12.3 and forms together therewith a constructional unit. The slide carriages 12.1 . . . 12.3 are received at two parallel arranged guide rods 14.1 and 14.2 that are fixed to the support plate 6 by means of a plurality of cross members 13.1 . . . 13.X, in such a manner that the individual fixed selector contacts 8.1 . . . 8.5 are connectable by a longitudinal displacement of the movable contacts 11.1 . . . 11.3 inclusive of slide carriages 12.1 . . . 12.3 along the guide rods 14.1 and 14.2. For this purpose, a rotational movement produced by the motor drive 4 is transmitted by means of the transmission module 3 to a threaded spindle 15 disposed in engagement with a spindle nut 16 that is provided at the middle slide carriage 12.2, so that a longitudinal displacement of the middle slide carriage 12.2 along the guide rods 14.1 and 14.2 can thus be produced. The remaining slide carriages 12.1 and 12.3 are in operative connection with the middle slide carriage 12.2 by way of a similarly longitudinally displaceable guide link 17 that is arranged at the second side of the support plate 6, in that the slide carriages 12.1 and 12.3 are mechanically coupled with the slide carriage 12.2 by way of the guide link 17. A more precise description of this mechanically constrained guidance of the slide carriages 12.1 and 12.3 by means of the slide carriage 12.2 can be inferred from the FIG. description further below with respect to FIG. 3. The plurality of cross members 13.1 . . . 13.3, at which the guide rods 14.1 and 14.2 are retained, additionally forms a mechanical abutment for the movable contacts 10.1 . . . 10.3 that are longitudinally displaceable inclusive of slide carriages 12.1 . . . 12.3, so that the regulating range of the on-load tap changer 1 is thus also mechanically limited.

FIG. 2b in that case shows the second side of the support plate 6, at which the switching means for uninterrupted switching are arranged. In the embodiment of FIG. 2b the switching means for the uninterrupted switching are vacuum interrupters 19.1 . . . 19.6, wherein in each instance two respective vacuum interrupters 19.1 and 19.2 or 19.3 and 19.4 or 19.5 and 19.6 are associated with each phase of the on-load tap changer 1 and cooperate with a corresponding selector contact unit 7.1 . . . 7.3. The vacuum interrupters 19.1 . . . 19.6 are switching means, which are known from the prior art, with a movable switch contact 20.1 . . . 20.6 as well as a fixed contact 18.1 . . . 18.6 that is not illustrated in more detail. Each of the vacuum interrupters 19.1 . . . 19.6 in that regard comprises a movable switch contact 20.1 . . . 20.6 that is arranged at the second side of the support plate 6 to be respectively pivotably connected with a coupling element 21.1 . . . 21.6 and a control lever 22.1 . . . 22.6. Provided at the pivotable connection between the corresponding coupling element 21.1 . . . 21.6 and the control lever 22.1 . . . 22.6 is, on the side facing the support plate 6, a respective rotatably mounted roller 23.1 . . . 23.6 that rolls along the upper side 24 of the guide link 17 under partially maintained contact. The upper side 24 of the guide link 17 has in that case a profiling in the form of lobes so that the vacuum interrupters 19.1 . . . 19.6 can be connected, i.e. opened or closed, by a longitudinal displacement of the guide link 17 in dependence on the profiling of the upper side 24 of the guide link 17.

Figure 3:
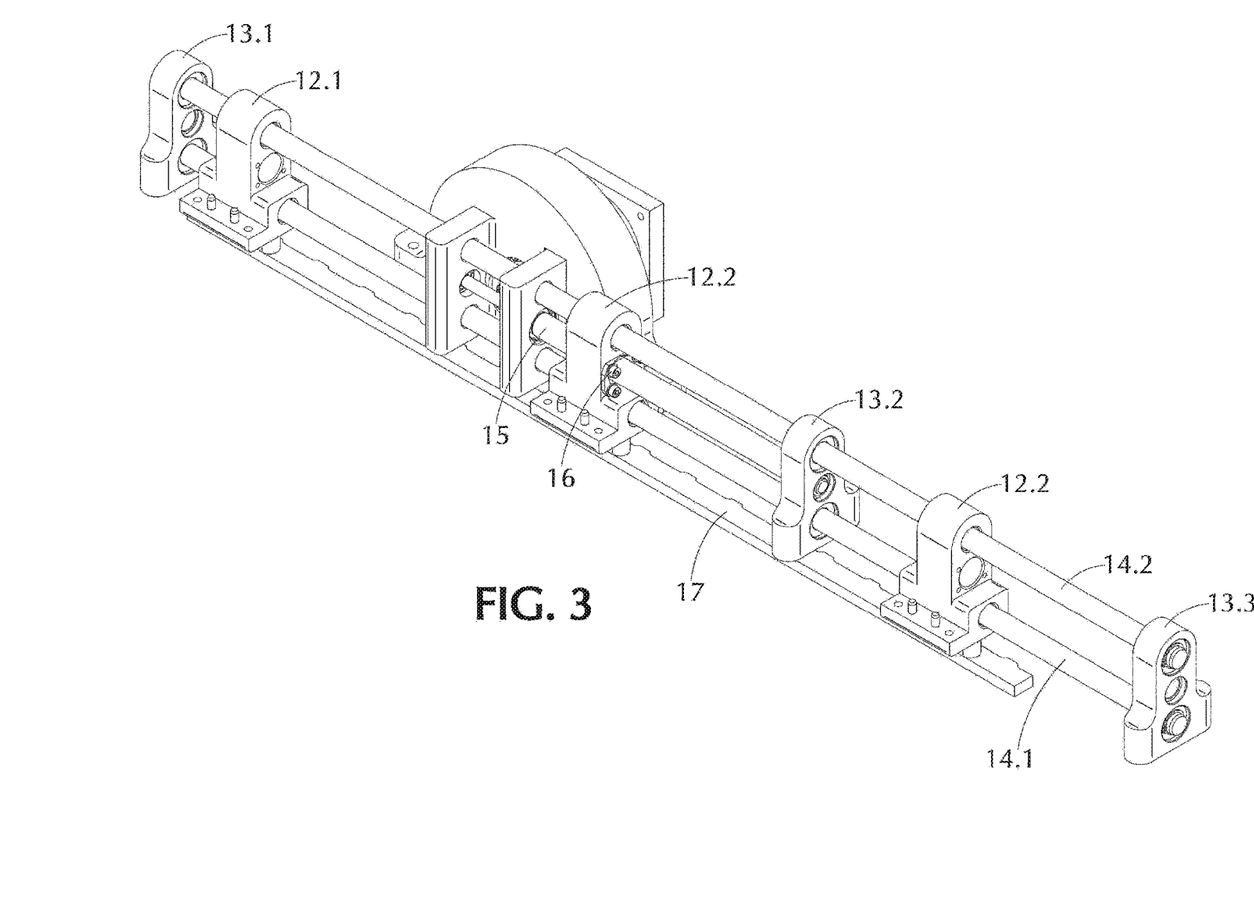
FIG. 3 is a detail view of the guide rods of an on-load tap changer according to the invention.

FIG. 3 shows a simplified detail view of the mechanical coupling of the slide carriages 12.1 . . . 12.3 with the guide link 17. The transmission module 3 is shown that transmits rotational movement by way of gears (not illustrated here in more detail) to the threaded spindle 15 that in turn passes on the rotational movement to a spindle nut 16 provided in the middle slide carriage 12.2, so that the rotational movement of the threaded spindle 15 is converted into a longitudinal movement of the middle slide carriage 12.2 along the guide rods 14.1 and 14.2. Due to the fact that the slide carriages 12.1 . . . 12.3 are mechanically intercoupled by means of the guide link 17, ultimately through a longitudinal displacement of the middle slide carriage 12.2 along the guide rods 14.1 and 14.2 a longitudinal displacement of the two other side carriages 12.1 and 12.3 is also produced.

Figure 4A:
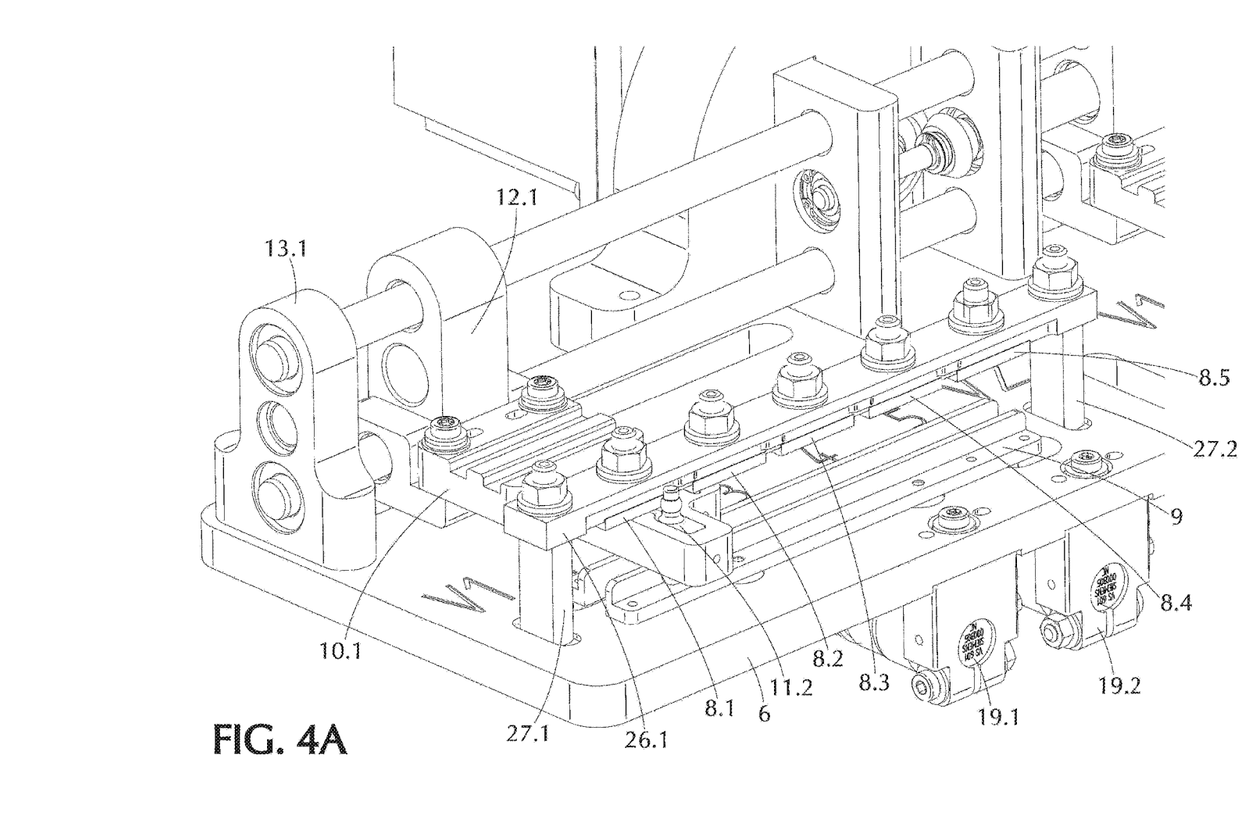
FIG. 4a is a further detail view of the selector contact unit of an on-load tap changer according to the invention.
Figure 4B:
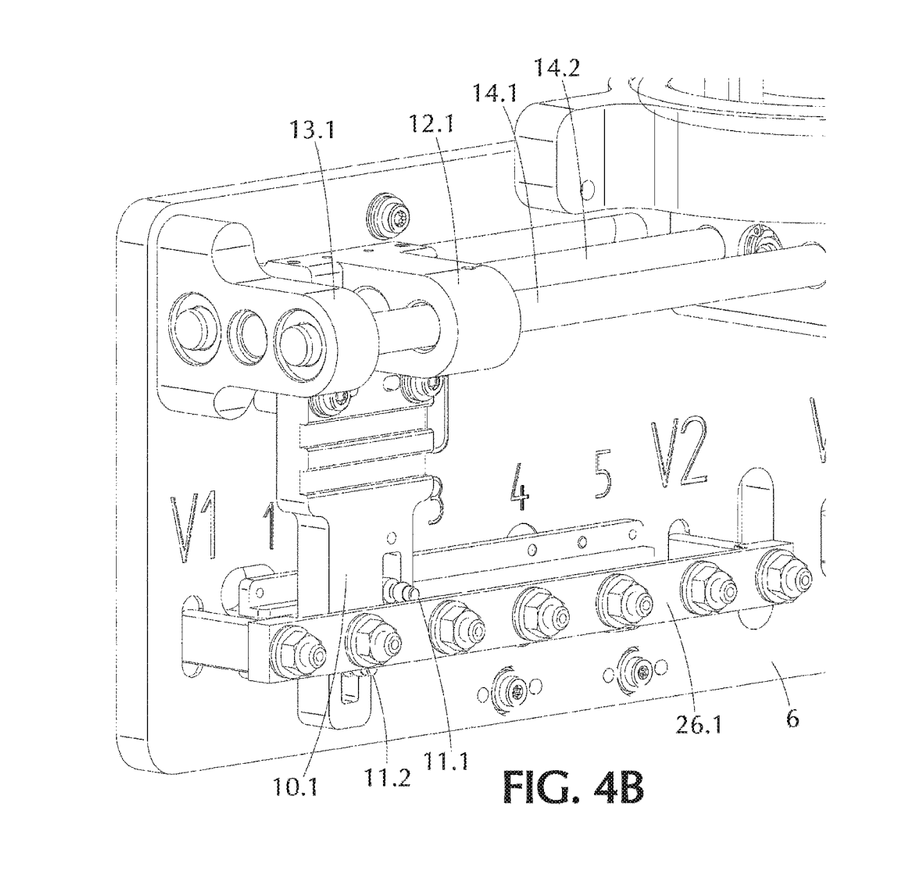
FIG. 4b is yet a further detail view of the selector contact unit of an on-load tap changer according to the invention.

FIGS. 4a and 4b show, in two different perspectives, a further detail view of the selector contact unit 7.1 of a phase of the on-load tap changer 1 according to the invention and explain this by way of example; the selector contact units 7.2 and 7.3 are of identical construction. The following explanations therefore also apply to these selector contact units 7.2 and 7.3. The fixed selector contacts 8.1 . . . 8.5 are in that case arranged at a contact strip 25.1 of plastics material, for example by means of a screw connection as illustrated here. The contact strip 25.1 is fastened to the support plate 6 by means of two respective spacers 27.1 and 27.2 that are used as connection of a switch-over choke (not illustrated). Moreover, the contact strip 25.1 has at the longitudinal side thereof a control link 26.1 at which several lobes 28.1 . . . 28.4 are arranged on both sides in order to vertically move the resiliently mounted selector contacts 11.1 and 11.2 of the corresponding selector contact unit 7.1 in the case of longitudinal displacement of the corresponding slide carriage 12.1, by means of the lobes 28.1 . . . 28.4 provided at the control link 26.1, in dependence on the profile of the plurality of lobes 28.1 . . . 28.4. The profile of the lobes 28.1 . . . 28.4 is in that case dimensioned so that the movable selector contacts 11.1, 11.2 of the selector contact unit 7.1 lift off the currently connected fixed selector contact, here 8.1, between two adjacent fixed selector contacts 8.1 . . . 8.5, since after switching-over is completed they connect again the next fixed selector contact, here 8.2. Thus, a middle setting of the movable selector contacts 11.1 and 11.2 at two adjacent fixed selector contacts 8.1 . . . 8.5 is permissible according to the reactor switching principle. In order to achieve defined contact-making, the contact members 11.1 and 11.2 are formed to be spherical at the actual contact surface.

Figure 5:
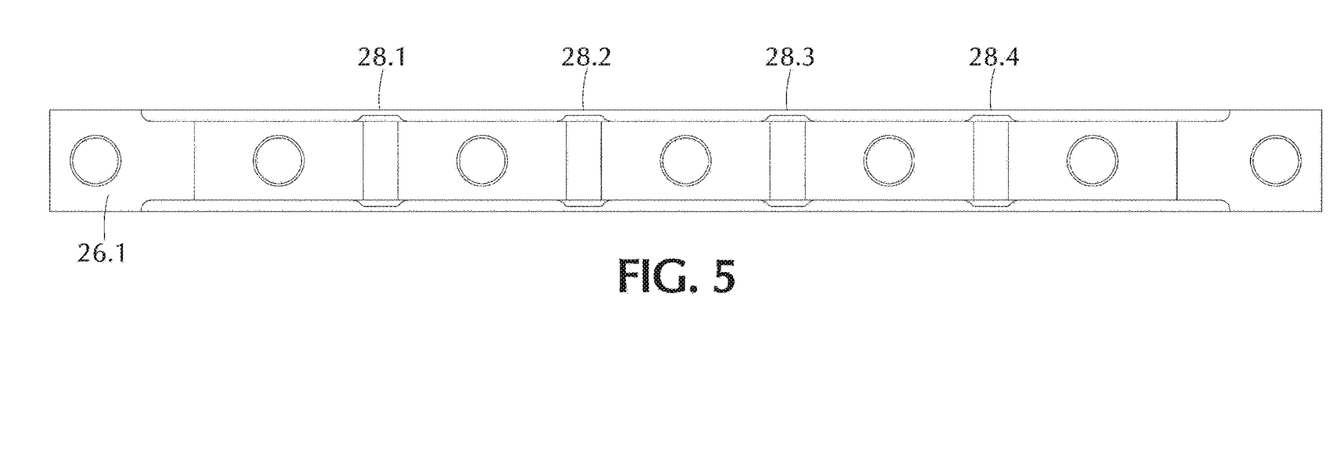
FIG. 5 shows a contact strip of an on-load tap changer according to the invention.

FIG. 5 shows the contact strip 25.1 . . . 25.3 with the control link 26.1 . . . 26.3 and the respective plurality of lobes 28.1 . . . 28.4 in a detail illustration, by means of which the corresponding movable selector contacts 11.1 and 11.2 or 11.3 and 11.4 or 11.5 and 11.6 of each selector contact unit 7.1 . . . 7.3 are vertically displaced during a switching-over process depending on the profiling of the lobes 28.1 . . . 28.4.

In the installed state of the on-load tap changer 1 according to the invention in a tapped transformer the movable switch contacts 20.1 . . . 20.6 of the vacuum interrupters 19.1 . . . 19.6 are electrically connected with the spacers 27.1 . . . 27.2 associated with the respective phase and thus ultimately with the corresponding switch-over chokes, whereas the corresponding fixed contacts 18.1 . . . 18.6 of the corresponding vacuum interrupters 19.1 . . . 19.6 are electrically connected with the contact rail 9 of the associated phase. However, in principle, it would also be conceivable to undertake the electrical connecting of the on-load tap changer 1 in a mode and manner exactly opposite to that just described.

Figure 6A:
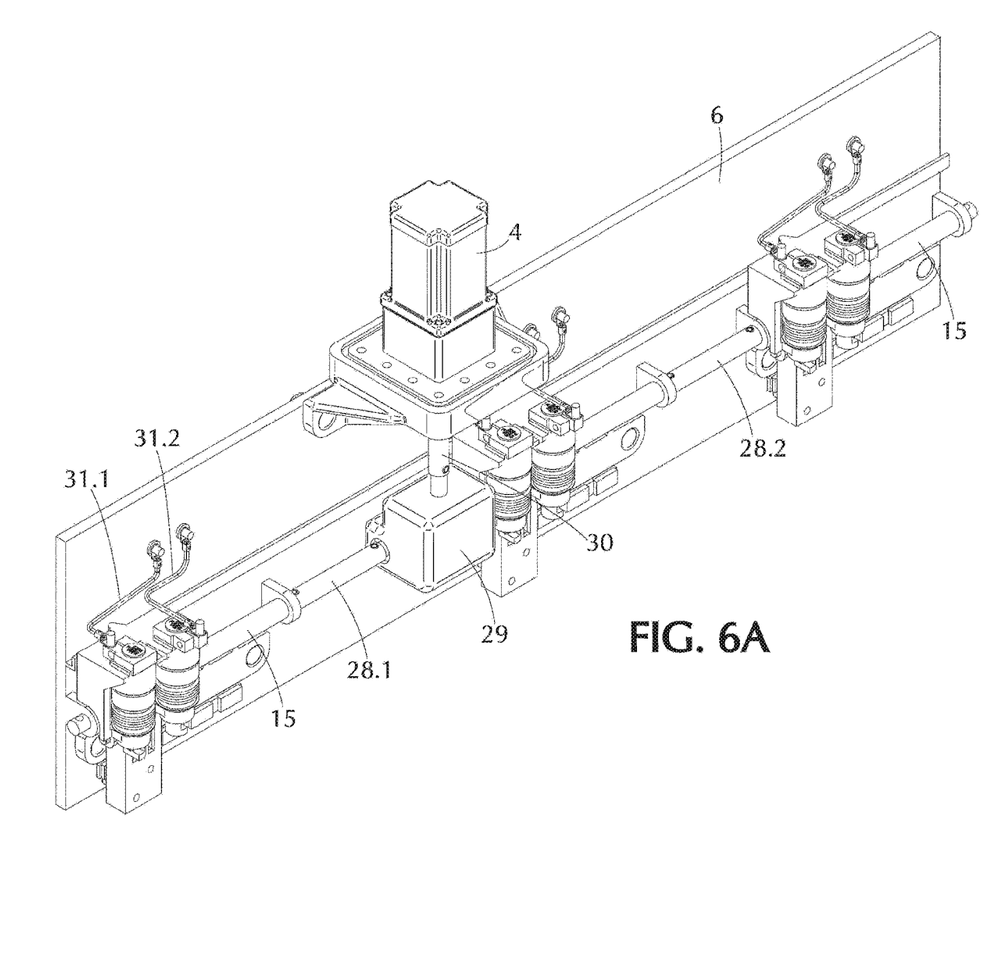
FIG. 6a is a side perspective view of a further form of embodiment of an on-load tap changer according to the invention.
Figure 6B:
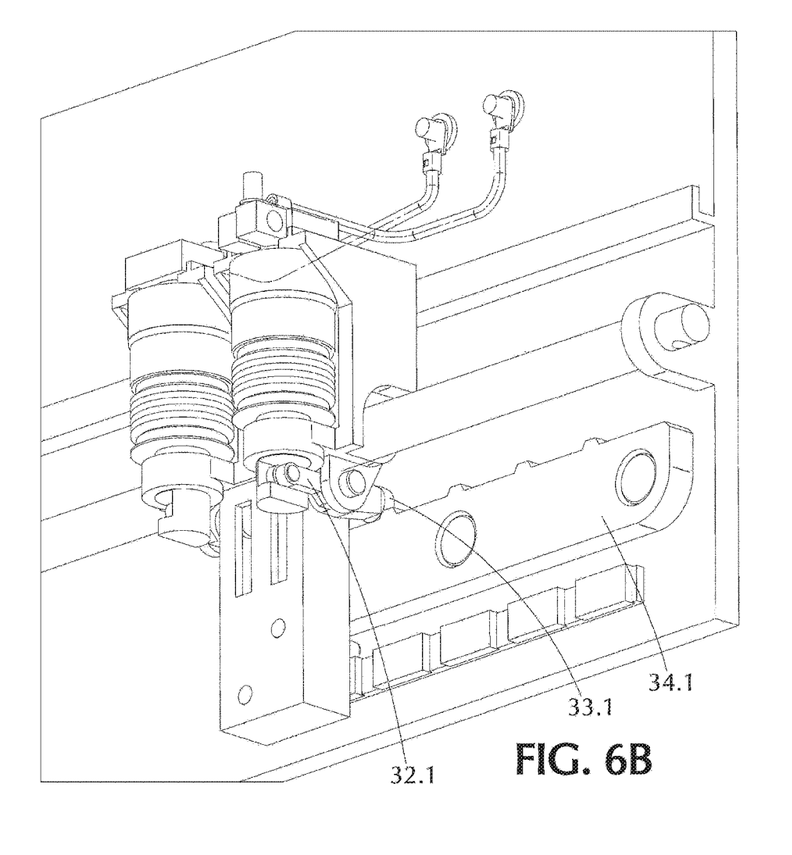

A further form of embodiment of an on-load tap changer 1 according to the invention is shown in FIGS. 6a and 6b. In the description of the figures, explanation is restricted to the differences from the preceding figures, wherein identical components are discussed with the same references numerals as in FIGS. 1 to 5. In this form of embodiment of the on-load tap changer 1 according to the invention the switching means for uninterrupted switching, thus the vacuum interrupters 19.1 . . . 19.6, are arranged directly at the corresponding slide carriage 12.1 . . . 12.3 of the respective selector contact unit 7.1 . . . 7.3 and constructed to be movable therewith along the threaded spindle 15. In this form of embodiment each selector contact unit 7.1 . . . 7.3 has its own spindle nut 16—not visible in this illustration—arranged in the corresponding slide carriage 12.1 . . . 12.3, so that the selector contact units 7.1 . . . 7.3 are thus constructed to be synchronously displaceable along the insulating shaft 15. The insulating shaft 15 is composed of a plurality of elements and has in each instance between the corresponding elements a coupling tube 28.1 . . . 28.2 formed from electrically insulating material. In addition, an angle transmission 29 is provided in order to pass on the rotational movement of the motor drive 3 to the threaded spindle 15. Arranged between the motor drive 3 and the angle transmission 29 is an insulating shaft 30 of dielectric material that introduces the rotational movement of the motor drive 3 into the angle transmission 29. The fixed contacts 18.1 . . . 18.6 of the vacuum interrupters 19.1 . . . 19.6 arranged at the corresponding slide carriage 12.1 . . . 12.3 are screw-connected with the support plate 6 by means of respective wires 31.1 . . . 31.6 and electrically connected with switch-over chokes (not illustrated). The movable switch contacts 20.1 . . . 20.6 of the vacuum interrupters 19.1 . . . 19.6 are in mechanically operative connection with a rocker arm arrangement 32.1 . . . 32.6 having a respective roller 33.1 . . . 33.6. In the installed state of the on-load tap changer 1 the movable switch contacts 20.1 . . . 20.6 of the vacuum interrupters 19.1 . . . 19.6 are electrically connected with the movable selector contacts 11.1 . . . 11.2 of the associated phase. The corresponding rollers 33.1 . . . 33.6 roll along the profiling of a guide rail 34.1 . . . 34.3 during longitudinal displacement of the slide carriage 12.1 . . . 12.3 so that the respective rocker arm arrangement 32.1 . . . 32.6 thereby connects, i.e. opens or closes, the corresponding movable switch contact 20.1 . . . 20.6 of the associated vacuum interrupter 19.1 . . . 19.6 in dependence on the profiling of the guide rail 34.1 . . . 34.3. The fixed selector contacts 8.1 . . . 8.5, of which only the fixed selector contacts 8.3 . . . 8.5 can be seen in this illustration, are here arranged directly on the support plate 6 and electrically connected on the opposite side (not illustrated here) of the support plate 6 with the corresponding winding taps of the regulating winding of the tapped transformer.

Figure 7A:
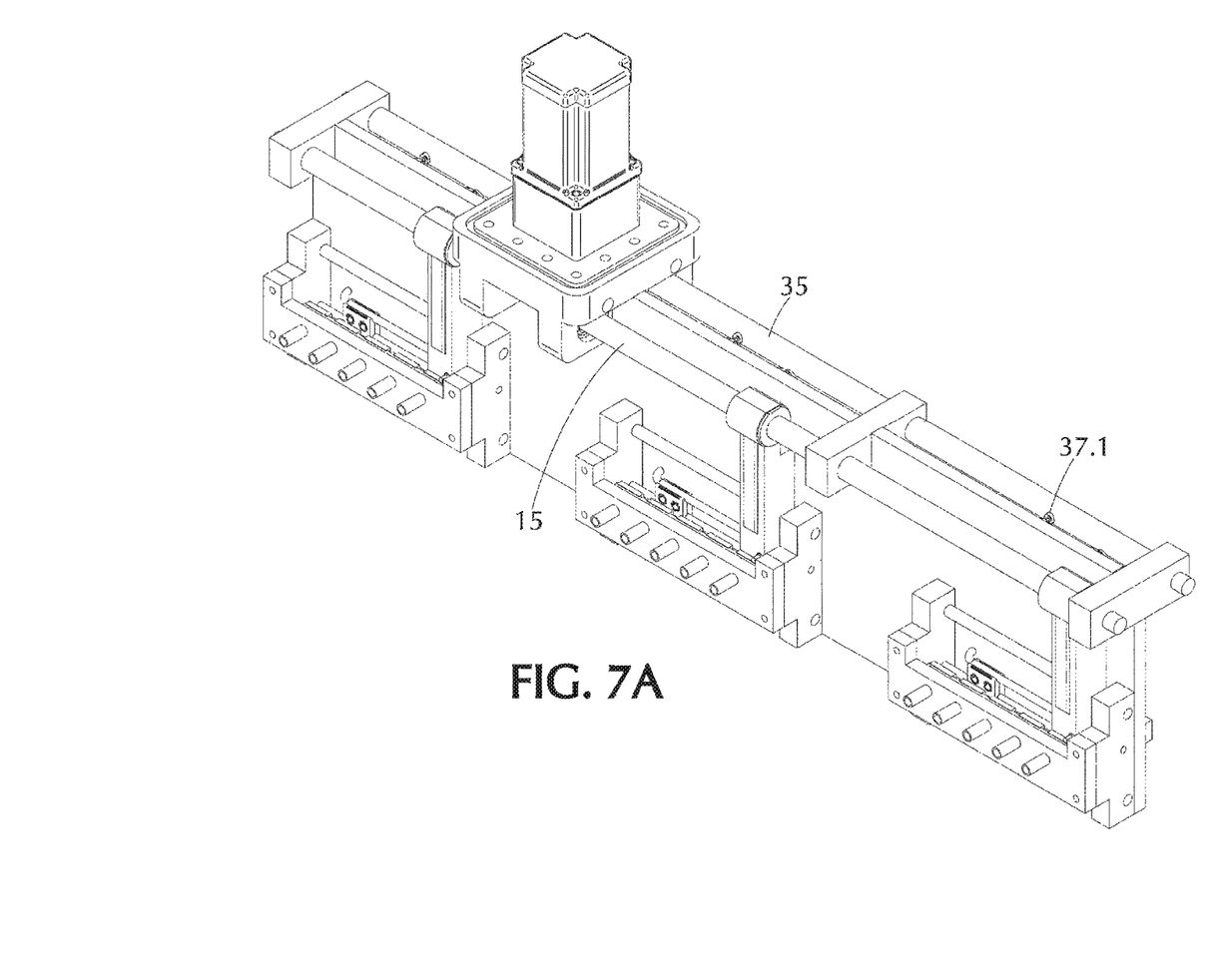
FIG. 7a is a first side perspective view of yet a further form of embodiment of an on-load tap changer according to the invention.
Figure 7B:
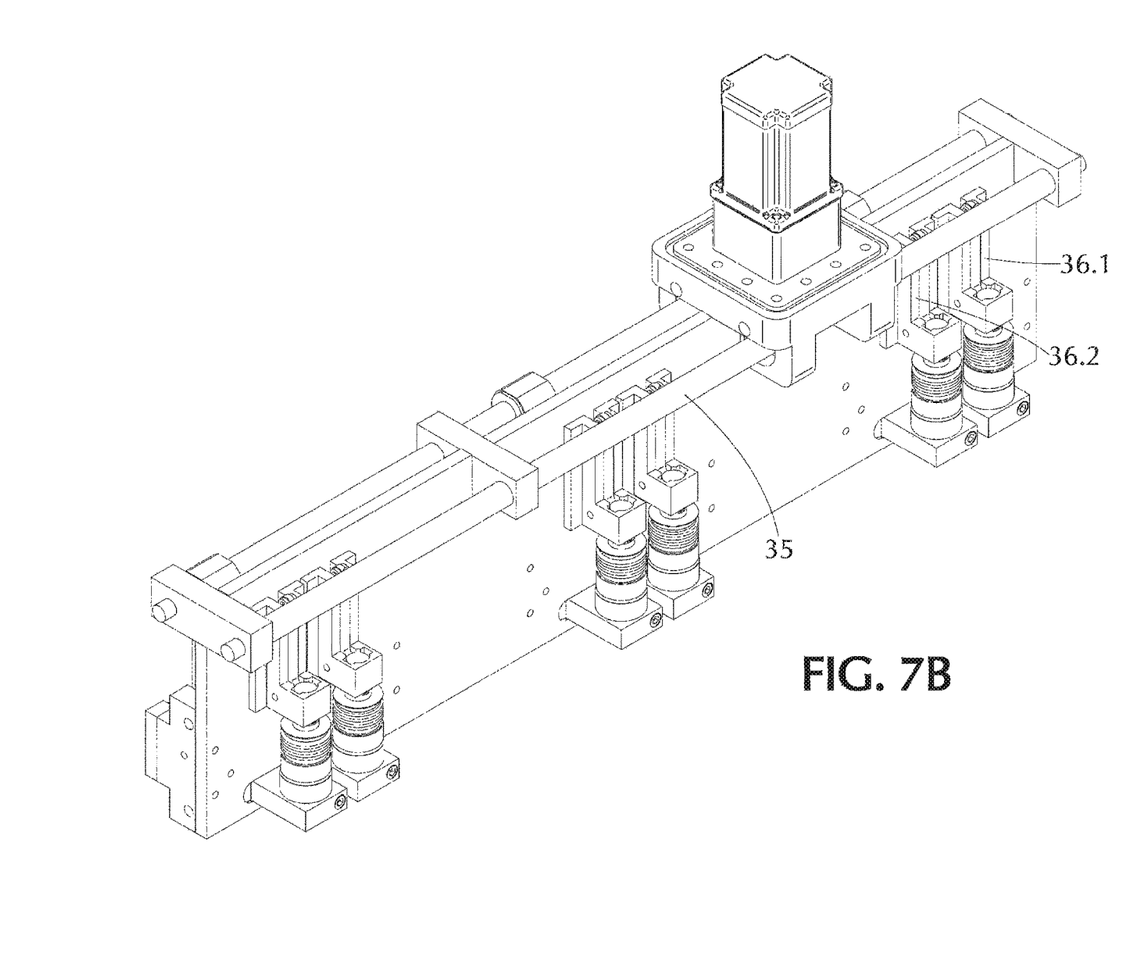

Yet a further form of embodiment of an on-load tap changer 1 according to the invention is shown in FIGS. 7a and 7b. In the case of the description of these figures, as well, explanation is restricted to the differences from the preceding figures, wherein identical components are discussed with the same reference numerals as in FIGS. 1 to 5. In the form of embodiment of FIGS. 7a and 7b there is driven by the motor drive 3 not only a threaded spindle 15 that is in turn in mechanically operative connection with each of the selector contact units 7.1 . . . 7.3, but also a camshaft 35, by way of which the switching means for uninterrupted switching, thus the vacuum interrupters 19.1 . . . 19.6, are actuatable. By contrast to the illustration of FIGS. 6a and 6b, the threaded spindle 15 is here constructed as a threaded spindle over its entire length and is in engagement with the spindle nut 16 that is provided in each of the slide carriages 12.1 . . . 12.3, in such a manner that each slide carriage 12.1 . . . 12.3 is horizontally moved when rotation of the threaded spindle 15 takes place. The other selector contact unit 7.1 . . . 7.3 is of identical construction to the selector contact unit 7.1 . . . 7.3 described in FIGS. 1 to 5. For actuation of the vacuum interrupters 19.1 ... 19.6 each movable switch contact 20.1 ... 20.6 is mechanically constrainedly coupled with a stroke rod 36.1 ... 36.6 that so cooperates with cam lobes 37.1 ... 37.6 that are opposite the movable switch contacts 20.1 ... 20.6 and arranged on the camshaft 35, that when rotation of the camshaft 35 takes place the cam lobe 37.1 ... 37.6 introduces a vertical movement into the corresponding stroke rod 36.1 ... 36.6 and thus ultimately actuates the associated movable switch contact 20.1 ... 20.6 of the corresponding vacuum interrupter 19.1 ... 19.6. Depending on the switching sequence on which the on-load tap changer 1 is based a plurality of cam lobes 37.1 ... 37.6 per vacuum interrupter 19.1 ... 19.6 is in that case provided at the circumference of the camshaft 35.

In summary, it can be emphasized that the on-load tap changer 1 according to the invention is usable not only in accordance with the reactor switching principle, but also in accordance with the resistance fast switching principle. Depending on the underlying switch-over principle nine stationary operational settings are permissible with the, here, five illustrated fixed selector contacts 8.1 ... 8.5 in accordance with the reactor switching principle, whereas merely five stationary operational settings are permissible with an on-load tap changer 1 according to the invention constructed in accordance with the resistance fast switching principle.

The invention claimed is:

1. An on-load tap changer for uninterrupted switching between different winding taps of a tapped transformer, wherein
    at least one selector contact unit has a plurality of fixed selector contacts that are arrayed along a line and each electrically connected with a respective one of the winding taps,
    the fixed selector contacts are actuatable by two longitudinally displaceable movable selector contacts,
    for the uninterrupted switching, two vacuum interrupters are provided for each phase as well as a motor drive for introducing a drive movement into the on-load tap changer,
    the on-load tap changer is supported by a transmission module on an underside of a transformer cover,
    a rotational movement generated by the motor drive is transmissible by the transmission module to a threaded spindle engaged with a spindle nut provided at a center slide carriage so as to longitudinally displace the center slide carriage along guide rods,
    other slide carriages are operatively connected with the center slide carriage by a similarly longitudinally displaceable guide link that is mechanically coupled with the center slide carriage, so that the remaining slide carriages in turn are so mechanically coupled with the center slide carriage by the guide link that not only the selector contact units, but also the vacuum interrupters for the uninterrupted load switching are thereby simultaneously actuatable.

2. The on-load tap changer according to claim 1, wherein the transmission module comprises a flange-like sealing module.

3. The on-load tap changer according to claim 1, wherein a support plate of a dielectric material has a first side provided with the at least one selector contact unit and at a second side provided with switching means for the uninterrupted switching.

4. The on-load tap changer according to claim 3, wherein each slide carriage is supported by two parallel arranged guide rods that are in turn mounted on the support plate by cross members.

5. The on-load tap changer according to claim 3, wherein the movable selector contacts are each received in a contact support and cooperate with fixed selector contacts arranged at the support plate.

6. The on-load tap changer according to claim 1, wherein the at least one selector contact unit comprises a slide carriage, a contact support and movable selector contacts that cooperate with at least one fixed selector contact.

7. The on-load tap changer according to claim 1, wherein the at least one selector contact unit is displaceable along the guide rods by the respective slide carriage such that it is able to run through a regulating range of the on-load tap changer.

8. The on-load tap changer according to claim 1, wherein the movable selector contacts of a phase in each stationary operational setting connect at least one of the fixed selector contact of the same phase of the on-load tap changer.

9. The on-load tap changer according to claim 1, wherein two of the movable selector contacts are resiliently mounted in a contact support.

10. The on-load tap changer according to claim 1, wherein
    a movable switch contact of each of the vacuum interrupters is pivotably and mechanically operatively connected with a coupling element and a control lever,
    provided at a pivotable connection between the corresponding coupling element and the control lever on a side facing the support plate is a roller that rolls along a profiled upper side of a guide link under partially maintained contact so that the respective vacuum interrupter is operable by a longitudinal displacement of the guide link in dependence on the profiling of the upper side thereof.

11. The on-load tap changer according to claim 1, wherein the fixed selector contacts are mounted on a contact strip fastened to a support plate by respective spacers.

12. The on-load tap changer according to claim 1, wherein the motor drive drives not only a threaded spindle that in turn is operatively connected with the selector contact unit, but also a camshaft that actuates the switching means for the uninterrupted switching in such a manner that both the movable switching contacts and the vacuum interrupters for the uninterrupted switching are thereby actuated.

13. The on-load tap changer according to claim 1, for use in voltage regulation of a distributing transformer.

14. An on-load tap changer for uninterrupted switching between different winding taps of a tapped transformer, wherein
    at least one selector contact unit has a plurality of fixed selector contacts that are arrayed in a line and each electrically connected with a respective one of the winding taps,
    the fixed selector contacts are actuatable by two longitudinally displaceable movable selector contacts,
    for the uninterrupted switching, two vacuum interrupters are provided for each phase as well as a motor drive for introducing a drive movement into the on-load tap changer,
    the on-load tap changer is supported by a transmission module carried on an underside of a transformer cover,
    each slide carriage is supported by two parallel arranged guide rods that are in turn mounted on the support plate by cross members,
    the cross-members form a mechanical abutment for the at least one selector contact unit that is displaceable along the guide rods in such a way that a regulating range of the on-load tap changer is mechanically limited.

15. An on-load tap changer for uninterrupted switching between different winding taps of a tapped transformer, wherein
- at least one selector contact unit has a plurality of fixed selector contacts that are arrayed along a line and each electrically connected with a respective one of the individual winding taps,
- the fixed selector contacts are actuatable by two longitudinally displaceable movable selector contacts,
- for the uninterrupted switching, two vacuum interrupters are provided for each phase as well as a motor drive for introducing a drive movement into the on-load tap changer,
- the on-load tap changer is carried by a transmission module mounted on an underside of a transformer cover,
- the fixed selector contacts are mounted on a contact strip fastened to a support plate by respective spacers,
- the contact strip has at its longitudinal side a control link having two sides each provided with several lobes.

16. An on-load tap changer for uninterrupted switching between different winding taps of a tapped transformer, wherein
- at least one selector contact unit with a plurality of fixed selector contacts that are arrayed along a line and each electrically connected with a respective one of the individual winding taps,
- the fixed selector contacts are actuatable by two longitudinally displaceable movable selector contacts,
- for the uninterrupted switching, two vacuum interrupters are provided for each phase as well as a motor drive for introducing a drive movement into the on-load tap changer,
- the on-load tap changer is carried by a transmission module mounted on an underside of a transformer cover,
- the fixed selector contacts are mounted on a contact strip fastened to a support plate by respective spacers,
- the contact strip has at its longitudinal side a control link having two sides each provided with several lobes,
- a profile of the lobes is so dimensioned that the movable selector contacts of the corresponding selector contact unit between two adjacent fixed selector contacts lift off the currently connected fixed selector contact, since the movable selector contacts again connect the next fixed selector contact after switching has been completed.

17. An on-load tap changer for uninterrupted switching between different winding taps of a tapped transformer, wherein
- at least one selector contact unit has a plurality of fixed selector contacts that are arrayed along a line and each electrically connected with the individual winding taps,
- the fixed selector contacts are actuatable by two longitudinally displaceable movable selector contacts,
- for the uninterrupted switching, two vacuum interrupters are provided for each phase as well as a motor drive for introducing a drive movement into the on-load tap changer, and
- the on-load tap changer is carried by a transmission module mounted on an underside of a transformer cover,
- two respective vacuum interrupters per phase are directly arranged at a respective slide carriage of the selector contact unit,
- the motor drive drives a central threaded spindle by an angle transmission,
- each slide carriage has a separate spindle nut, and
- the threaded spindle cooperates with the spindle nut of each slide carriage and rotation can be converted into a synchronous longitudinal displacement of the plurality of slide carriages in such a manner that not only the movable selector contacts, but also the vacuum interrupters are thereby actuatable.

* * * * *